(12) United States Patent
Ashitaka

(10) Patent No.: US 9,488,088 B2
(45) Date of Patent: Nov. 8, 2016

(54) WORK VEHICLE AND METHOD OF CONTROLLING WORK VEHICLE

(71) Applicant: KOMATSU LTD., Tokyo (JP)

(72) Inventor: Masanori Ashitaka, Hirakata (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/370,313

(22) PCT Filed: May 16, 2014

(86) PCT No.: PCT/JP2014/063067
§ 371 (c)(1),
(2) Date: Jul. 2, 2014

(87) PCT Pub. No.: WO2014/185520
PCT Pub. Date: Nov. 20, 2014

(65) Prior Publication Data
US 2015/0330281 A1 Nov. 19, 2015

(51) Int. Cl.
*F01P 3/12* (2006.01)
*F01N 3/28* (2006.01)
*F01P 7/04* (2006.01)
(Continued)

(52) U.S. Cl.
CPC .............. *F01N 3/2896* (2013.01); *F01P 3/12* (2013.01); *F01P 3/20* (2013.01); *F01P 7/04* (2013.01); *F01P 7/042* (2013.01); *F01P 7/16* (2013.01); *E02F 9/0866* (2013.01); *F01N 3/2066* (2013.01); *F01N 2610/10* (2013.01); *F01N 2610/1406* (2013.01); *F16D 35/024* (2013.01); *F16D 2300/18* (2013.01)

(58) Field of Classification Search
CPC .......... F01N 3/28; F01N 3/2896; F01P 7/16; F01P 3/12
See application file for complete search history.

(56) References Cited

U.S. PATENT DOCUMENTS 7,805,930 B2 * 10/2010 Satou et al. ............... 60/286
2010/0071637 A1 3/2010 Shintani et al.
(Continued)

FOREIGN PATENT DOCUMENTS

JP 2005-188333 A 7/2005
JP WO 2009/050948 A1 4/2009
(Continued)

OTHER PUBLICATIONS

"How Car Cooling System Works" (https://youtu.be/V7inC4IOpGs), published Aug. 12, 2013, accessed Dec. 20, 2015.*

*Primary Examiner* — Lindsay Low
*Assistant Examiner* — Kevin Lathers
(74) *Attorney, Agent, or Firm* — Drinker Biddle & Reath LLP

(57) ABSTRACT

A work vehicle includes an engine, an exhaust gas purification apparatus, a reducing agent tank, an engine coolant circuit, a branch path, a valve, an accepting portion, a valve control unit, a fan, a radiator, a thermostat, and a fan control unit. The valve control unit gives an instruction for an opening operation of the valve in response to the operation instruction from the operator accepted by the accepting portion. The fan generates cooling wind in an engine room. The radiator cools the engine coolant with the cooling wind. The thermostat is provided between the circulation path and the radiator and operates to open for supplying the engine coolant to the radiator when a temperature of the engine coolant is equal to or higher than a prescribed temperature. The fan control unit increases the number of rotations of the fan in response to the operation instruction.

8 Claims, 11 Drawing Sheets

(51) Int. Cl.
  *F01P 7/16*     (2006.01)
  *F01P 3/20*     (2006.01)
  *F16D 35/02*    (2006.01)
  *F01N 3/20*     (2006.01)
  *E02F 9/08*     (2006.01)

(56) References Cited

U.S. PATENT DOCUMENTS

2010/0242439 A1* 9/2010 Domon et al. ............... 60/274

2010/0327794 A1* 12/2010 Ohshima ..................... 318/503
2013/0061949 A1  3/2013 Minezawa et al.
2013/0092366 A1  4/2013 Hyodo et al.

FOREIGN PATENT DOCUMENTS

| JP | 2011-241735 A | 12/2011 |
| JP | 2012-002161 A | 1/2012 |
| JP | 2012-237232 A | 12/2012 |
| JP | 2014-005738 A | 1/2014 |

* cited by examiner

WORK VEHICLE AND METHOD OF CONTROLLING WORK VEHICLE

TECHNICAL FIELD

The present invention relates to a work vehicle and a method of controlling a work vehicle.

BACKGROUND ART

An exhaust treatment apparatus is mounted on such a work vehicle as a hydraulic excavator, a bulldozer, and a wheel loader. As the exhaust treatment apparatus, for example, a diesel particulate filter apparatus (DPF), a diesel oxidation catalyst apparatus (DOC), a selective catalytic reduction apparatus (SCR), and the like are available.

An exhaust treatment apparatus reduces a nitrogen oxide (NOx) contained in a gas exhausted from an engine (an exhaust gas), to a harmless gas through NOx reduction reaction. A work vehicle includes a reducing agent tank for storing a reducing agent for NOx reduction reaction, and the reducing agent stored in the reducing agent tank is injected into the exhaust gas.

When an outside temperature is low and when a reducing agent stored in a reducing agent tank is frozen, there is a possibility that the reducing agent cannot be supplied to the exhaust treatment apparatus.

Therefore, for prevention of freeze of a reducing agent stored in a reducing agent tank, PTD 1 proposes a scheme for preventing a reducing agent from freezing, by introducing an engine coolant into a reducing agent tank and exchanging heat between the engine coolant and the reducing agent.

Specifically, PTD 1 proposes a scheme for preventing a reducing agent from freezing by exchanging heat between a reducing agent and a coolant which flows through a path formed by branching a part of a circulation path for an engine coolant and introducing the path into a reducing agent tank.

CITATION LIST

Patent Document

PTD 1: Japanese Patent Laying-Open No. 2011-241735

SUMMARY OF INVENTION

Technical Problem

In a case that an engine coolant is introduced into a reducing agent tank as in PTD 1, a new path is added to a path through which the engine coolant circulates. Here, air should sufficiently be released before making use of an additional path. If release of air is insufficient, the engine coolant is not sufficiently supplied to the path and efficiency in heat exchange is lowered.

In a circulation path, a radiator for cooling an engine coolant and a thermostat for supplying the engine coolant to the radiator by operating to open and close based on a temperature of the engine coolant are provided. When the thermostat opens, a supply path to the radiator is added to the circulation path and hence a length of the path increases. When the path for circulation of the engine coolant is long, it takes time for the engine coolant to circulate, and air release may become insufficient.

The present invention was made to solve the problem described above, and an object of the present invention is to provide a work vehicle in which air in a path for supplying an engine coolant into a reducing agent tank can sufficiently be released and a method of controlling a work vehicle.

Other tasks and novel features will become apparent from the description herein and the attached drawings.

Solution to Problem

A work vehicle according to one aspect of the present invention includes an engine, an exhaust gas purification apparatus, a reducing agent tank, an engine coolant circuit, a branch path, a valve, an accepting portion, a valve control unit, a fan, a radiator, a thermostat, and a fan control unit. The exhaust gas purification apparatus purifies a nitrogen oxide in an exhaust gas emitted from the engine. The reducing agent tank stores a reducing agent to be supplied to the exhaust gas purification apparatus. The engine coolant circuit includes a water pump for circulating an engine coolant for cooling of the engine through a circulation path as the engine is driven. The branch path is branched from the circulation path and provided for heat exchange between the engine coolant and the reducing agent in the reducing agent tank. The valve controls supply of the engine coolant into the branch path. The accepting portion accepts an operation instruction from an operator. The valve control unit gives an instruction for an opening operation of the valve in response to the operation instruction from the operator accepted by the accepting portion. The fan generates cooling wind in an engine room. The radiator cools the engine coolant with the cooling wind. The thermostat is provided between the circulation path and the radiator and operates to open for supplying the engine coolant to the radiator when a temperature of the engine coolant is equal to or higher than a prescribed temperature. The fan control unit increases the number of rotations of the fan in response to the operation instruction from the operator accepted by the accepting portion.

According to the work vehicle in the present invention, the fan control unit increases the number of rotations of the fan in response to the operation instruction from the operator accepted by the accepting portion. By suppressing increase in temperature of the engine coolant, the thermostat is prevented from operating to open to add to the circulation path, a supply path to the radiator. Thus, air in the path for supplying the engine coolant into the reducing agent tank can sufficiently be released.

Preferably, the work vehicle further includes an engine coolant sensor for detecting a temperature of the engine coolant. The fan control unit can select any one of a first control line provided such that the number of rotations of the fan increases in accordance with increase in temperature of the engine coolant and a second control line higher in the number of rotations of the fan set in accordance with increase in temperature in the engine coolant than the first control line, and controls the number of rotations of the fan in accordance with the second control line when the operation instruction from the operator has been given.

According to the above, the number of rotations of the fan can be controlled by switching between the first and second control lines, so that the number of rotations of the fan can be increased with a simplified scheme.

Preferably, the fan control unit sets the number of rotations of the fan to a maximum number of rotations in response to the operation instruction from the operator. By setting the number of rotations of the fan to the maximum number of rotations, increase in temperature of the engine coolant can easily be suppressed.

Preferably, the accepting portion is implemented by a monitor apparatus. The monitor apparatus outputs the operation instruction to the valve control unit and the fan control unit.

According to the above, the accepting portion is implemented by a monitor apparatus and the monitor apparatus outputs an operation instruction to the valve control unit. Thus, the operator can easily give an instruction to perform processing for releasing air.

Preferably, the valve control unit is configured to give an instruction for a closing operation of the valve after lapse of a prescribed period since it gave the instruction for the opening operation of the valve.

According to the above, since an instruction for a closing operation of the valve is given after lapse of a prescribed period, it is not necessary to request an operation from an operator and convenience can be enhanced.

Preferably, the reducing agent tank is provided on one end side in a longitudinal direction of a body frame, and the engine is provided on the other end side in the longitudinal direction of the body frame.

According to the above, since the reducing agent tank and the engine are provided on one end side and the other end side in a longitudinal direction of the body frame, respectively, influence by the engine which is a heat source on the reducing agent tank can be suppressed.

Preferably, the branch path has a low region provided in midstream of a path through which the engine coolant flows and a high region higher than the low region provided downstream of the low region.

According to the above, the branch path can allow sufficient air release also in a construction in which it is difficult to release air represented by a case of a region having a height difference from low to high in midstream of a path.

A method of controlling a work vehicle according to one aspect of the present invention includes the steps of accepting an instruction for an opening operation by an operator, of a valve provided in a path for introducing an engine coolant into a reducing agent tank, outputting an instruction signal indicating an opening operation of the valve in response to acceptance of the instruction for the opening operation by the operator after increase in number of rotations of the engine, and outputting a command signal for increasing the number of rotations of a fan in response to acceptance of the instruction for the opening operation by the operator.

According to the method of controlling a work vehicle in the present invention, the step of outputting an instruction signal indicating an opening operation of a valve in response to acceptance of the instruction for the opening operation by an operator and outputting a command signal for increasing the number of rotations of a fan in response to acceptance of the instruction for the opening operation by the operator are included. Thus, while increase in temperature of the engine coolant is suppressed by increasing the number of rotations of the fan in accordance with the opening operation of the valve, the engine coolant is supplied into a path for supplying the coolant into a reducing agent tank, and air is sufficiently released.

Advantageous Effects of Invention

Air in a path for supplying an engine coolant into a reducing agent tank can sufficiently be released.

DESCRIPTION OF EMBODIMENTS

An embodiment of the present invention will be described hereinafter with reference to the drawings.

<Overall Construction>

Figure 1:
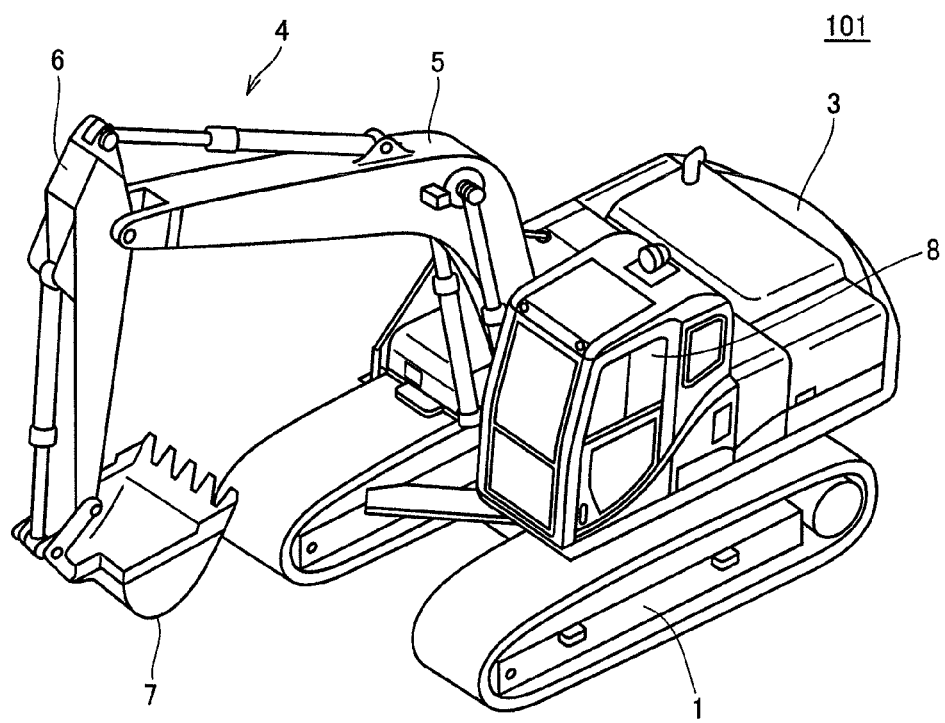
FIG. 1 is a diagram illustrating appearance of a work vehicle 101 based on an embodiment.

FIG. 1 is a diagram illustrating appearance of a work vehicle 101 based on an embodiment.

As shown in FIG. 1, in the present example, a hydraulic excavator will mainly be described by way of example as work vehicle 101 based on the embodiment.

Work vehicle 101 mainly includes a lower carrier 1, an upper revolving unit 3, and a work implement 4. A work vehicle main body is constituted of lower carrier 1 and upper revolving unit 3. Lower carrier 1 has a pair of left and right crawler belts. Upper revolving unit 3 is attached revolvably, with a revolving mechanism in an upper portion of lower carrier 1 being interposed.

Work implement 4 is pivotably supported by upper revolving unit 3 in a manner operable in a vertical direction and performs such working as excavation of soil. Work implement 4 includes a boom 5, an arm 6, and a bucket 7. Boom 5 has a root portion movably coupled to upper revolving unit 3. Arm 6 is movably coupled to a tip end of boom 5. Bucket 7 is movably coupled to a tip end of arm 6. In addition, upper revolving unit 3 includes an operator's cab 8 or the like.

<Construction of Operator's Cab>

Figure 2:
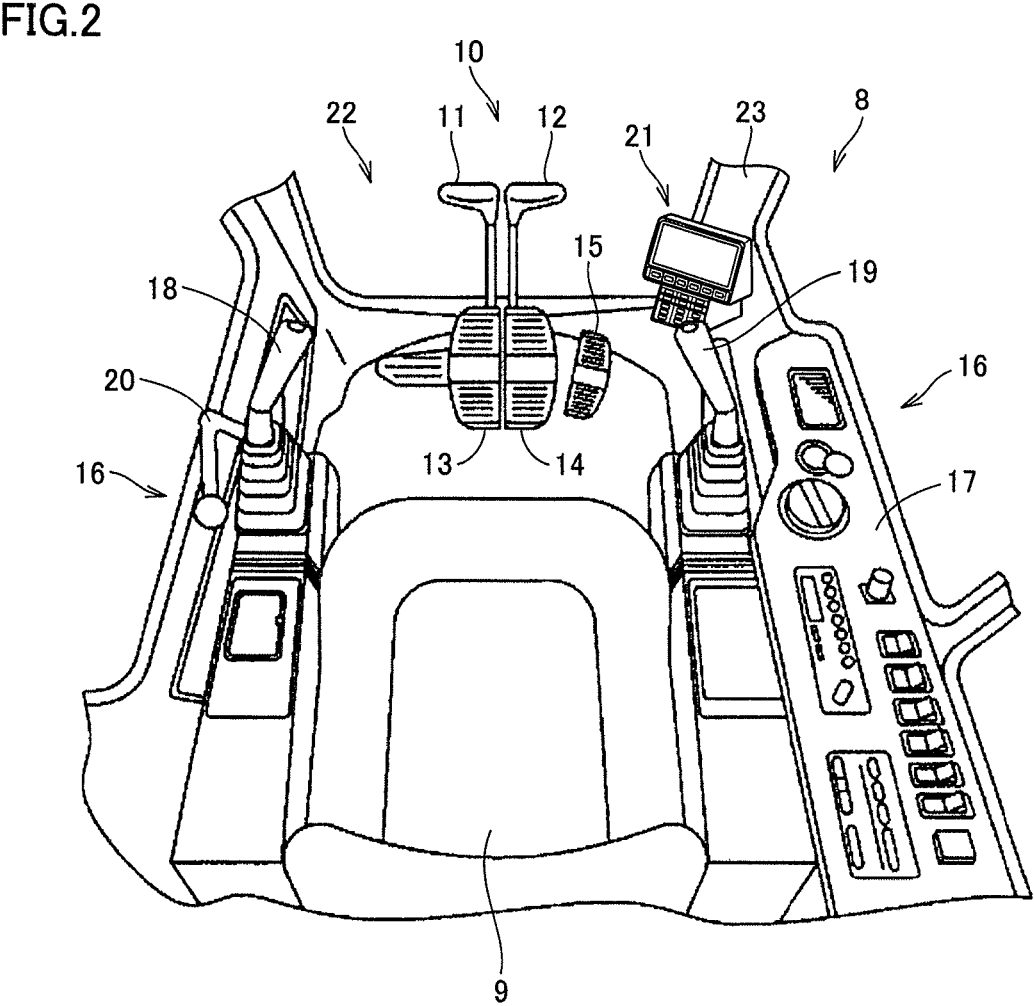
FIG. 2 is a perspective view showing an internal construction of an operator's cab 8 based on the embodiment.

FIG. 2 is a perspective view showing an internal construction of operator's cab 8 based on the embodiment.

As shown in FIG. 2, operator's cab 8 has an operator's seat 9, a travel operation portion 10, a pedal for attachment 15, a side window 16, a dashboard 17, work implement levers 18, 19, a locking lever 20, a monitor apparatus 21, a front window 22, and a vertical frame 23.

Operator's seat 9 is provided in a central portion of operator's cab 8. Travel operation portion 10 is provided in front of operator's seat 9.

Travel operation portion 10 includes travel levers 11, 12 and travel pedals 13, 14. Travel pedals 13, 14 can move together with respective travel levers 11, 12. Lower carrier 1 moves forward as an operator pushes forward travel lever 11, 12. Alternatively, lower carrier 1 moves backward as the operator pulls backward travel lever 11, 12.

Pedal for attachment 15 is provided in the vicinity of travel operation portion 10. In addition, dashboard 17 is provided in the vicinity of right side window 16 in FIG. 2.

Work implement levers 18, 19 are provided in left and right portions of operator's seat 9, respectively. Work implement lever 18, 19 serves to carry out vertical movement of boom 5, pivot of arm 6 and bucket 7, a revolving operation of upper revolving unit 3, and the like.

Locking lever 20 is provided in the vicinity of work implement lever 18. Here, locking lever 20 serves to stop such functions as operation of work implement 4, revolution of upper revolving unit 3, and travel of lower carrier 1. By performing an operation for positioning locking lever 20 in a vertical state (here, an operation for pulling down the locking lever), movement of work implement 4 or the like can be locked (restricted).

Monitor apparatus 21 is provided in a lower portion of vertical frame 23 which is a partition between front window 22 and one side window 16 of operator's cab 8 and it displays an engine state of work vehicle 101, guidance information, warning information, or the like. In addition, monitor apparatus 21 is provided to be able to accept a setting instruction as to various operations of work vehicle 101.

Here, an engine state refers, for example, to a temperature of an engine coolant, a temperature of hydraulic oil, an amount of remaining fuel, and the like. Guidance information includes an indication and the like inviting check and maintenance of the engine of the work vehicle, by way of example. Various operations refer, for example, to setting of a prescribed mode (an air release mode). Warning information is information to which operator's attention should be called.

<Configuration of Control System>

Figure 3:
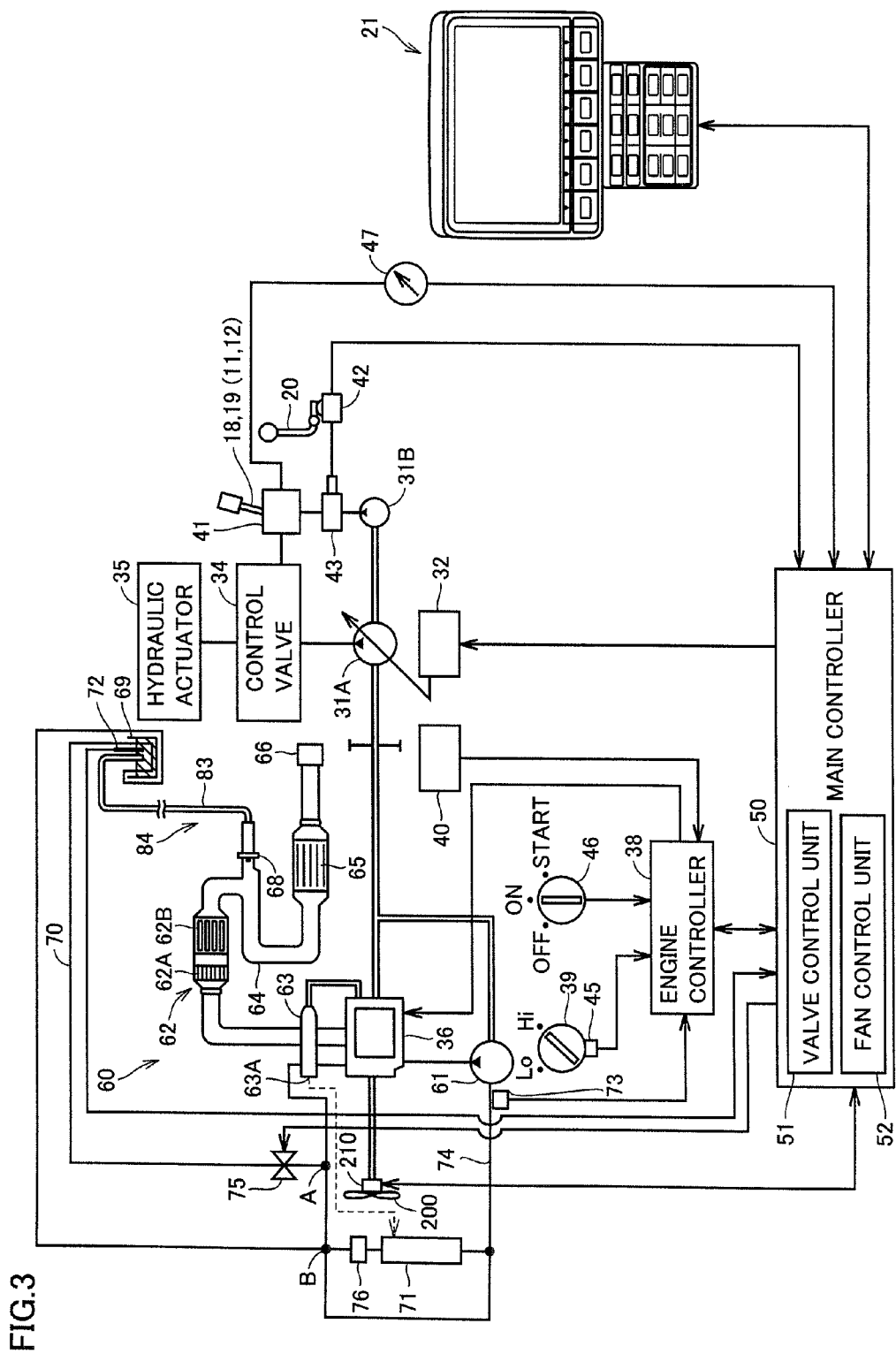
FIG. 3 is a simplified diagram showing a configuration of a control system of work vehicle 101 based on the embodiment.

FIG. 3 is a simplified diagram showing a configuration of a control system of work vehicle 101 based on the embodiment.

As shown in FIG. 3, the control system of work vehicle 101 includes, by way of example, work implement lever 18, 19 and travel lever 11, 12, locking lever 20, monitor apparatus 21, a first hydraulic pump 31A, a second hydraulic pump 31B, a swash plate drive apparatus 32, a control valve 34, a hydraulic actuator 35, an engine 36, and an engine controller 38. The control system further includes a fuel dial 39, a rotation sensor 40, a work implement lever apparatus 41, a pressure switch 42, a valve 43, a potentiometer 45, a starter switch 46, a pressure sensor 47, a main controller 50, a radiator 71, a thermostat 76, a water pump 61, a turbo charger 63, a circulation path 74, a branch path 70, a sensor 73, a long life coolant (LLC) valve 75, a fan 200, and a fan drive portion 210.

In addition, the control system of work vehicle 101 further includes an exhaust gas purification apparatus 60 and a reducing agent tank 69.

Exhaust gas purification apparatus 60 further includes an exhaust purification unit 62, a relay connection pipe (mixing piping) 64, a selective catalytic reduction apparatus 65, a flue 66, and a reducing agent injector 84.

Reducing agent injector 84 has a reducing agent supply path 83 and a reducing agent injection valve 68.

Exhaust purification unit 62 includes a diesel oxidation catalyst apparatus 62A and a diesel particulate filter apparatus 62B.

First hydraulic pump 31A discharges hydraulic oil used for driving work implement 4 or the like.

Second hydraulic pump 31B discharges oil made use of for generating a hydraulic pressure (a pilot pressure) in accordance with an operation of work implement lever 18, 19 and travel lever 11, 12. Swash plate drive apparatus 32 is connected to first hydraulic pump 31A.

Swash plate drive apparatus 32 drives based on an instruction from main controller 50 and changes an angle of inclination of a swash plate of first hydraulic pump 31A. Hydraulic actuator 35 is connected to first hydraulic pump 31A with control valve 34 being interposed. Hydraulic actuator 35 is a cylinder for boom, a cylinder for arm, a cylinder for bucket, a hydraulic motor for revolution, a hydraulic motor for travel, and the like.

Control valve 34 is connected to work implement lever apparatus 41. Work implement lever apparatus 41 outputs to control valve 34, a pilot pressure in accordance with a direction of operation and/or an amount of operation of work implement lever 18, 19 and travel lever 11, 12. Control valve 34 controls hydraulic actuator 35 in accordance with the pilot pressure.

Work implement lever 18, 19 and travel lever 11, 12 as well as locking lever 20 are connected to second hydraulic pump 31B.

Pressure sensor 47 is connected to work implement lever apparatus 41. Pressure sensor 47 outputs to main controller 50, a lever operation signal in accordance with a state of operation of work implement lever 18, 19 and travel lever 11, 12.

Main controller 50 carries out such control that first hydraulic pump 31A absorbs best matching torque at each output point of engine 36, in accordance with pump absorption torque set in accordance with an amount of working, the number of rotations of the engine set with fuel dial 39 or the like, the actual number of rotations of the engine, and the like.

Engine 36 has a drive shaft connected to first hydraulic pump 31A and second hydraulic pump 31B. Engine 36 has a drive shaft connected to fan drive portion 210 for rotating fan 200.

Turbo charger 63 makes use of energy of the exhaust gas to introduce compressed air into a main body of engine 36.

Engine controller 38 controls an operation of engine 36 in accordance with an instruction from main controller 50. Engine 36 is a diesel engine by way of example. The number of engine rotations of engine 36 is set with fuel dial 39 or the like and the actual number of engine rotations is detected by rotation sensor 40. Rotation sensor 40 is connected to engine controller 38. Engine controller 38 notifies main controller 50 of the number of engine rotations detected by rotation sensor 40.

Fuel dial 39 is provided with potentiometer 45, which detects an amount of operation of fuel dial 39 and outputs a value indicated by a dial (also referred to as a dial indication value) regarding the number of rotations of engine 36 to engine controller 38. A target number of rotations of engine 36 is adjusted in accordance with the dial indication value of fuel dial 39.

In response to an instruction from main controller 50, engine controller 38 controls an amount of injection of fuel injected by a fuel injector and adjusts the number of rotations of engine 36, based on the dial indication value. Engine controller 38 adjusts the number of engine rotations of engine 36 in accordance with a control instruction from main controller 50 to first hydraulic pump 31A.

Starter switch 46 is connected to engine controller 38. As the operator operates starter switch 46 (sets the starter switch to start), a start signal is output to engine controller 38 so that engine 36 starts.

Main controller 50 is a controller controlling overall work vehicle 101, and it is configured with a CPU (Central Processing Unit), a non-volatile memory, a timer, and the like. Main controller 50 controls engine controller 38 and monitor apparatus 21. Though main controller 50 and engine controller 38 are separate from each other in the present example, one common controller can also be provided.

Pressure switch 42 is connected to locking lever 20. Pressure switch 42 senses an operation of locking lever 20 when it is operated toward a locking side, and sends a signal to valve (solenoid valve) 43. Since valve 43 thus cuts off supply of oil, such functions as operation of work implement 4, revolution of upper revolving unit 3, and travel of lower carrier 1 can be stopped. In addition, pressure switch 42 sends a similar signal also to main controller 50.

Water pump 61 circulates an engine coolant in circulation path 74 as engine 36 is driven. Circulation path 74 is routed to cool engine 36 and turbo charger 63 with the engine coolant. Circulation path 74 is coupled to radiator 71 for cooling the engine coolant, with thermostat 76 being interposed. Thermostat 76 opens when the engine coolant attains to a prescribed temperature and closes when the engine coolant is lower than a prescribed temperature. Thus, when the engine coolant attains to a prescribed temperature, the engine coolant flows into radiator 71, and when the engine coolant is lower than a prescribed temperature, no engine coolant flows into radiator 71.

Branch path 70 is provided in circulation path 74. In the present example, branch path 70 starts from a branch point A, is introduced into reducing agent tank 69, and ends at a branch point B. Branch path 70 is provided to bypass a part of the path between branch point A and branch point B of circulation path 74.

Branch path 70 is introduced into reducing agent tank 69. In reducing agent tank 69, heat is exchanged between the engine coolant which flows through the branch path and the reducing agent stored in reducing agent tank 69. Thus, the reducing agent stored in the reducing agent tank can be prevented from freezing. Alternatively, the reducing agent which was frozen at the time of start of the engine can be thawed.

LLC valve 75 is provided around branch point A in branch path 70. LLC valve 75 performs an opening and closing operation in response to an instruction from main controller 50. In response to an instruction to perform an opening operation from main controller 50, LLC valve 75 is opened. Thus, the engine coolant is supplied from branch point A of circulation path 74 through branch path 70 into reducing agent tank 69, and the engine coolant returns to branch point B of circulation path 74.

Sensor 73 is provided in circulation path 74, and detects a state of the engine coolant in the path. In the present example, a temperature of the engine coolant is detected as a state of the engine coolant. Sensor 73 is connected to engine controller 38. Engine controller 38 notifies main controller 50 of a detection result obtained from circulation path 74.

Radiator 71 is provided with a replenishment port for replenishment with the engine coolant. The replenishment port also functions as an air release port for air which stays in a path through which the engine coolant circulates.

Diesel oxidation catalyst apparatus 62A has a function to decrease nitric oxide (NO) of nitrogen oxides (NOx) in the exhaust gas from engine 36 and increase nitrogen dioxide ($NO_2$).

Diesel particulate filter apparatus 62B is an apparatus treating an exhaust from engine 36. Diesel particulate filter apparatus 62B is constructed to collect particulate matters included in the exhaust from engine 36 with a filter and burn the collected particulate matters. The filter is composed, for example, of ceramics.

Selective catalytic reduction apparatus 65 serves to reduce a nitrogen oxide NOx by using ammonia ($NH_3$) resulting from hydrolysis, for example, of a urea solution as a reducing agent. Selective catalytic reduction apparatus 65 applies, in principle, chemical reaction of a nitrogen oxide (NOx) with ammonia ($NH_3$), which results in reduction to nitrogen ($N_2$) and water ($H_2O$). For example, reducing agent tank 69 containing a urea solution is mounted on work vehicle 101. It is noted that the reducing agent is not limited to a urea solution and a reducing agent should only be able to reduce a nitrogen oxide NOx.

Relay connection pipe (mixing piping) 64 connects between diesel particulate filter apparatus 62B and selective catalytic reduction apparatus 65. In this mixing piping 64, a reducing agent is injected to an exhaust gas from the diesel particulate filter apparatus to selective catalytic reduction apparatus 65 and mixed.

Reducing agent injector 84 injects a reducing agent (a urea solution) pumped up from reducing agent tank 69 into the exhaust gas through reducing agent supply path 83 and reducing agent injection valve 68.

A sensor 72 is provided for reducing agent tank 69 and detects a state of a reducing agent stored in reducing agent tank 69. In the present example, a temperature of the reducing agent is detected as a state of the reducing agent. Then, sensor 72 outputs a result of detection from reducing agent tank 69 to main controller 50.

Flue 66 is connected to selective catalytic reduction apparatus 65 and it serves to exhaust an exhaust which has passed through selective catalytic reduction apparatus 65 into the atmosphere.

Fan 200 is provided in an engine room, and it rotates to generate cooling wind in the engine room. The cooling wind cools the engine room including engine 36 and cools the engine coolant within the circulation path including radiator 71.

Fan drive portion 210 controls rotation of fan 200.

Main controller 50 includes a valve control unit 51 for controlling LLC valve 75 and a fan control unit 52 for controlling fan drive portion 210.

Valve control unit 51 indicates an opening and closing operation of LLC valve 75 in response to an instruction from monitor apparatus 21. Fan control unit 52 controls the number of rotations of fan 200 in accordance with a temperature of the engine coolant from sensor 73. Fan control unit 52 adjusts the number of rotations of fan 200 in response to an instruction from monitor apparatus 21.

It is noted that engine 36, exhaust gas purification apparatus 60, reducing agent tank 69, water pump 61 and circulation path 74, branch path 70, LLC valve 75, valve control unit 51, and fan control unit 52 represent examples of the "engine", the "exhaust gas purification apparatus," the "reducing agent tank," the "engine coolant circuit," the "branch path", the "valve", the "valve control unit," and the "fan control unit" of the present invention, respectively.

<Construction of Fan>

Figure 4:
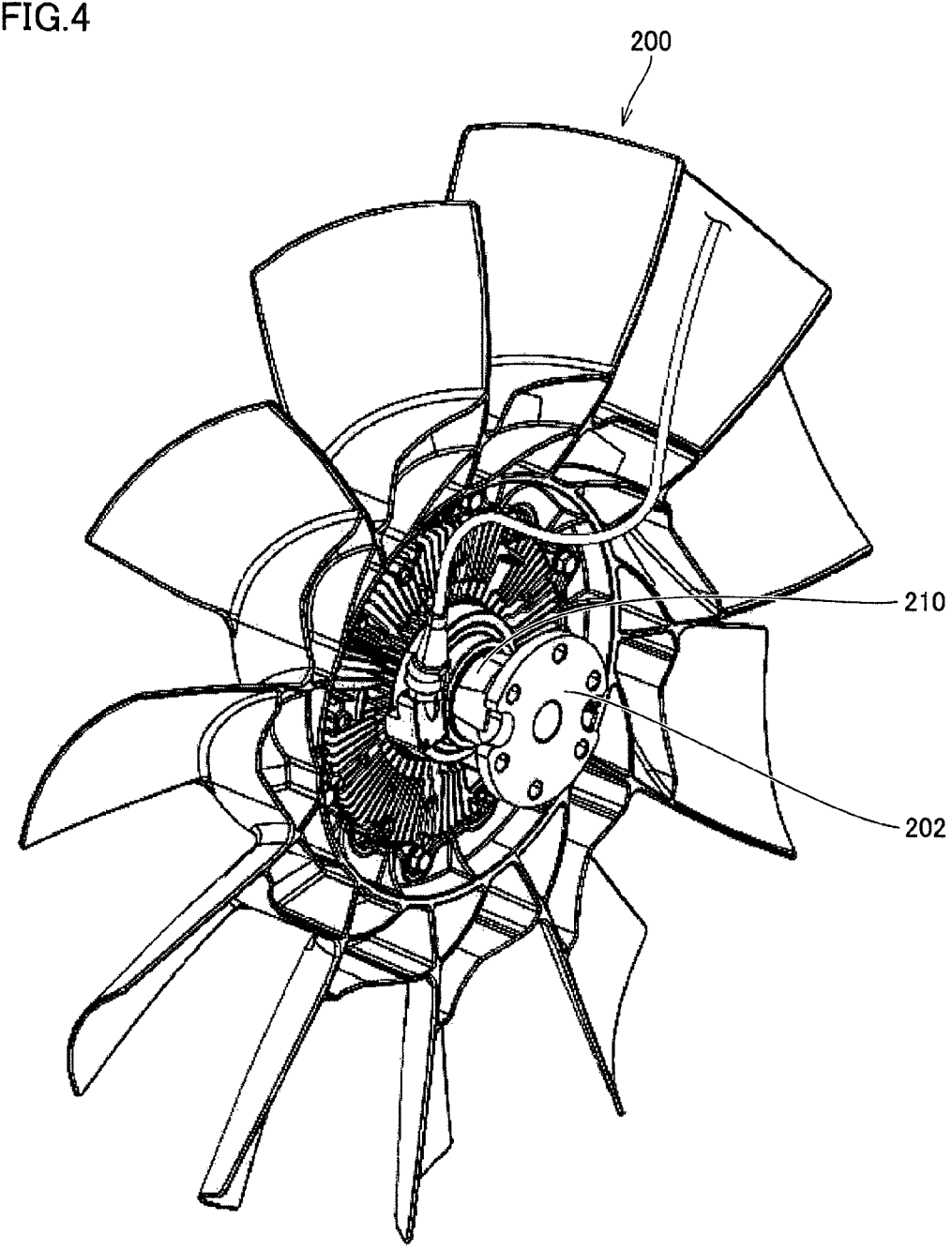
FIG. 4 is a diagram of appearance of a fan 200 based on the present embodiment.

FIG. 4 is a diagram of appearance of fan 200 based on the present embodiment.

Referring to FIG. 4, fan 200 is constituted of 11 blades. Fan drive portion 210 is coupled to an output shaft 202 of engine 36 and controls rotation of fan 200 by means of a fluid coupling.

Figure 5:
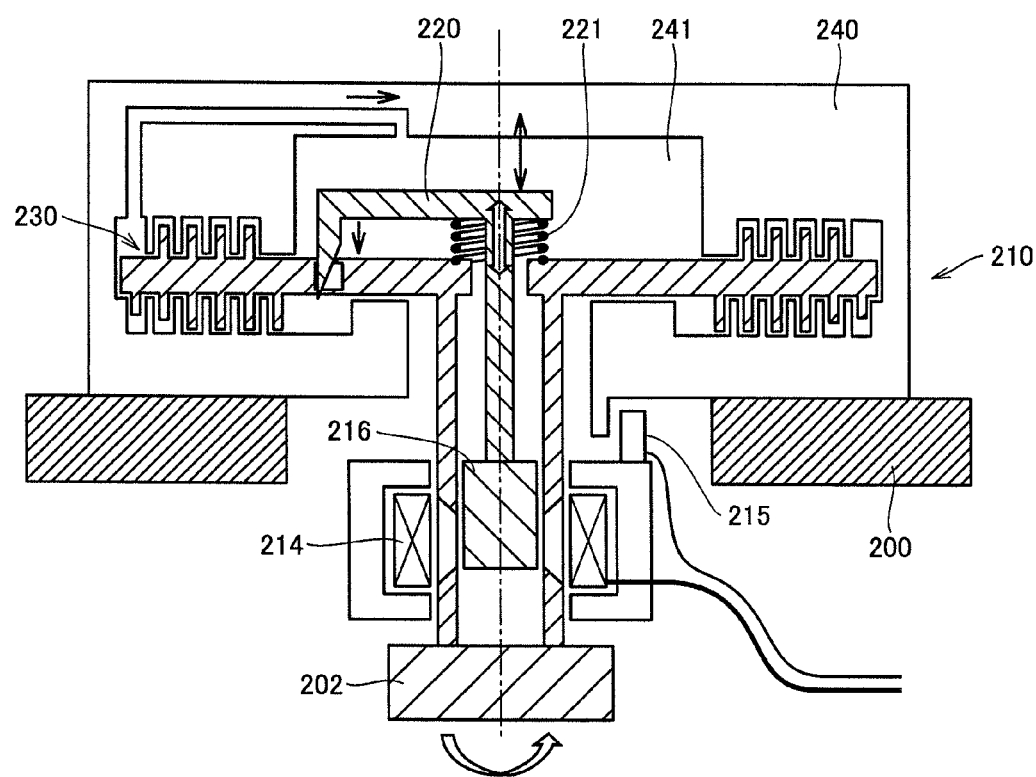
FIG. 5 is a diagram illustrating a construction of a fan drive portion 210 based on the present embodiment.

FIG. 5 is a diagram illustrating a construction of fan drive portion 210 based on the present embodiment.

Referring to FIG. 5, fan drive portion 210 includes a case 240, a clutch portion 230, a spring 221, a solenoid movable element 216, a solenoid coil 214, an adjustment member 220, and a hall element 215.

An oil reservoir 241 within case 240 is filled with silicon oil, and rotation of fan 200 is controlled by adjusting an amount of silicon oil to clutch portion 230.

Solenoid movable element 216 is coupled to adjustment member 220. By increasing an amount of current supplied to solenoid coil 214, solenoid movable element 216 compresses spring 221 to push down adjustment member 220. On the other hand, by decreasing an amount of current supplied to solenoid coil 214, force pushing down solenoid movable element 216 is weakened and repulsion force of spring 221 pushes up adjustment member 220.

In accordance with a position of adjustment member 220, an amount of silicon oil which flows from oil reservoir 241 to clutch portion 230 is regulated. By pushing down adjustment member 220, an amount of silicon oil which flows into clutch portion 230 decreases. By pushing up adjustment member 220, an amount of silicon oil which flows into clutch portion 230 increases.

With change in an amount of silicon oil, shear resistance changes and the number of rotations of fan 200 changes. With increase in an amount of silicon oil which flows into clutch portion 230, shear resistance increases and the number of rotations of fan 200 increases. With decrease in an amount of silicon oil which flows into clutch portion 230, shear resistance lowers and the number of rotations of fan 200 decreases.

Hall element 215 detects the number of rotations of fan 200 and outputs a result of detection to a fan controller which will be described later. The fan controller controls an amount of current supplied to solenoid coil 214 such that the number of rotations of fan 200 detected by hall element 215 attains to a desired number of rotations.

Though a scheme for adjusting the number of rotations of fan 200 by means of a fluid coupling including silicon oil has been described, limitation thereto is not particularly intended, and fan drive portion 210 may employ such a scheme as an electromagnetic clutch to adjust the number of rotations of fan 200.

Fan control unit 52 controls the number of rotations of fan 200 in accordance with a temperature of the engine coolant from sensor 73. Specifically, it increases the number of rotations of fan 200 with increase in temperature of the engine coolant.

<Construction of Branch Path>

Figure 6:
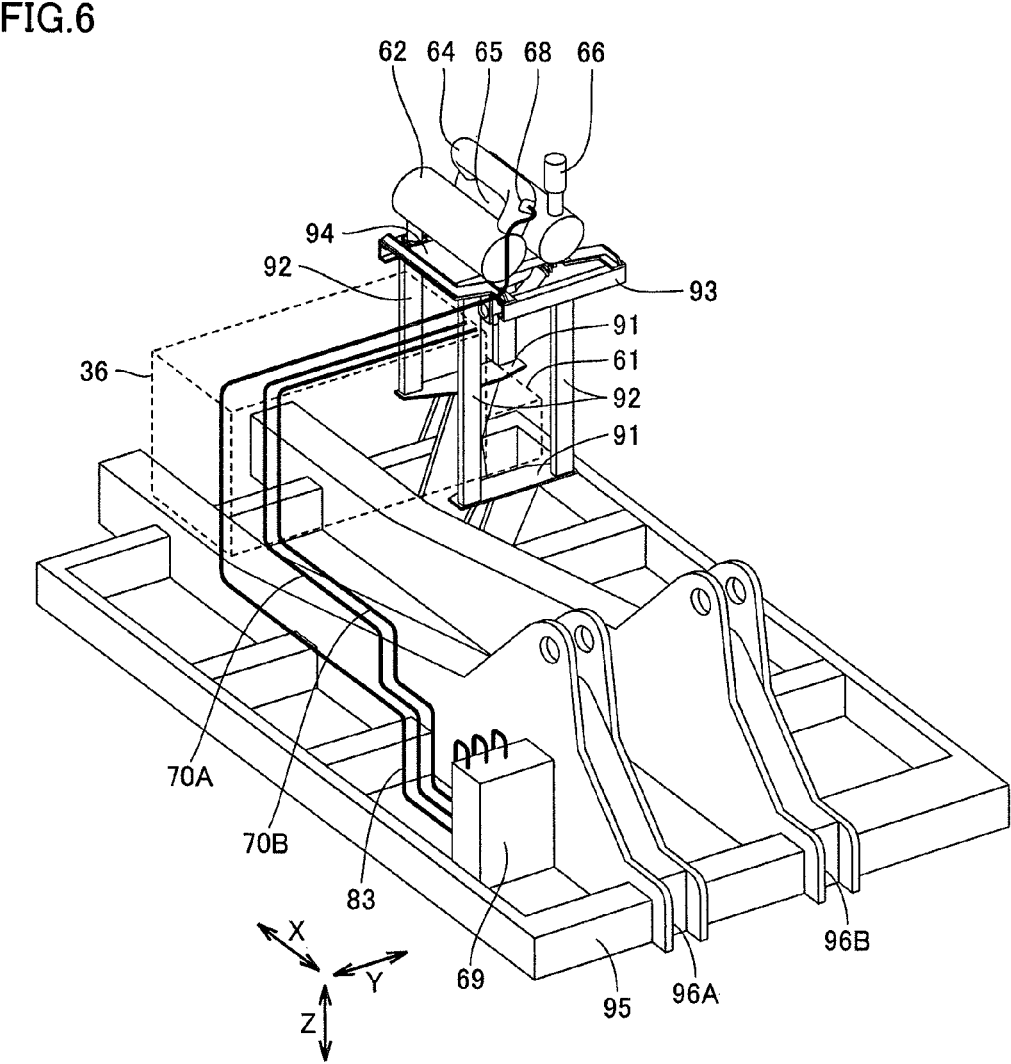
FIG. 6 is a diagram illustrating a path connected to a reducing agent tank 69 based on the present embodiment.

FIG. 6 is a diagram illustrating a path connected to reducing agent tank 69 based on the present embodiment.

Referring to FIG. 6, initially, an exhaust treatment unit is described. Engine 36 and the exhaust treatment unit are supported by a body frame 95 independently of each other.

Specifically, as features of a support for supporting the exhaust treatment unit on the frame, two plates 91, four vertical frames (pillar members) 92, a horizontal frame 93, and a bracket 94 are provided.

Each of two plates 91 has a flat plate shape and is attached to body frame 95. Each of four vertical frames 92 has a shape like a pillar and is attached to plate 91. Each of four vertical frames 92 extends upward from a position of attachment to plate 91.

Horizontal frame 93 is attached to vertical frame 92. Horizontal frame 93 supports bracket 94.

Bracket 94 has a flat plate shape. Bracket 94 is attached to horizontal frame 93.

Bracket 94 supports exhaust purification unit 62 and selective catalytic reduction apparatus 65.

Relay connection pipe (mixing piping) 64 is provided between exhaust purification unit 62 and selective catalytic reduction apparatus 65, and urea solution piping (reducing agent supply path) 83 connects relay connection pipe (mixing piping) 64 and reducing agent tank 69 to each other.

Selective catalytic reduction apparatus 65 serves to selectively reduce a nitrogen oxide NOx, for example, by making use of ammonia obtained by hydrolysis of a urea solution.

Reducing agent injector 84 (FIG. 3) mainly has reducing agent injection valve 68 and reducing agent supply path 83.

Reducing agent tank 69 is constructed to be able to store the urea solution. This reducing agent tank 69 is arranged, for example, outside the engine room, and supported by body frame 95.

Reducing agent supply path 83 connects this reducing agent tank 69 and mixing piping 64 to each other. This reducing agent supply path 83 can guide the urea solution stored in reducing agent tank 69 to mixing piping 64.

The urea solution stored in reducing agent tank 69 is injected and supplied into mixing piping 64 from reducing agent injection valve 68 through reducing agent supply path 83.

In reducing agent injector 84 above, reducing agent supply path 83 is connected as extending from the same side in a longitudinal direction (an X direction) (a front side in the drawing) as a portion of connection of mixing piping 64 to exhaust purification unit 62. A connection portion of reducing agent supply path 83 to mixing piping 64 is on the upstream side of an exhaust path in mixing piping 64. Thus, the urea solution injected and supplied to mixing piping 64 is evenly mixed with the exhaust while it runs from upstream to downstream in mixing piping 64.

Water pump 61 is provided adjacent to engine 36 and water pump 61 is connected to circulation path 74. Branch point A and branch point B of circulation path 74 and branch path 70 are connected to each other. Branch path 70 is provided in a detachable and attachable manner, with respect to branch points A and B of circulation path 74.

Here, vertical plates 96A and 96B to which work implement 4 is attached are provided in body frame 95, and reducing agent supply path 83 is arranged to extend along vertical plate 96A (in the X direction).

Similarly to reducing agent supply path 83, branch path 70 is also arranged to extend along vertical plate 96A (in the X direction).

Reducing agent supply path 83 and branch path 70 with respect to reducing agent tank 69 are both arranged to extend along a direction from a lower surface portion of reducing agent tank 69 to an upper surface portion (in a Z direction) around reducing agent tank 69.

In the present example, reducing agent tank 69 is arranged at a front end portion (on a front side in the figure) in the longitudinal direction (in the X direction) of body frame 95, while engine 36 is arranged at a rear end portion (on a rear side in the figure) in the longitudinal direction (in the X direction) of body frame 95. By thus arranging reducing agent tank 69 away from engine 36, deterioration of quality of the reducing agent in reducing agent tank 69 due to influence by a heat source such as engine 36 can be suppressed. By spacing reducing agent tank 69 apart from engine 36, a path length of branch path 70 increases.

Figure 7:
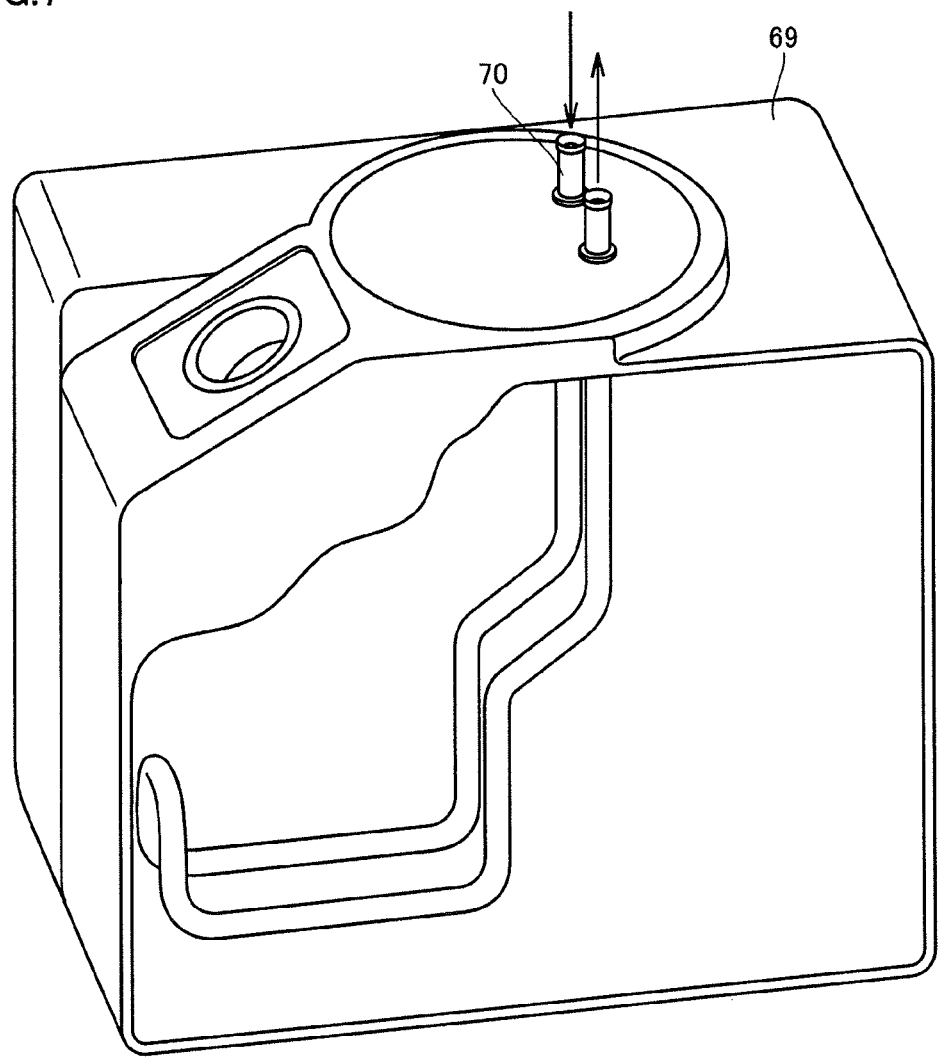
FIG. 7 is a diagram illustrating an internal state of reducing agent tank 69 based on the present embodiment.

FIG. 7 is a diagram illustrating an internal state of reducing agent tank 69 based on the present embodiment.

Referring to FIG. 7, branch path 70 is introduced into reducing agent tank 69. Branch path 70 is arranged along a direction from the lower surface portion of reducing agent tank 69 to the upper surface portion around reducing agent tank 69 and introduced from the upper surface side of reducing agent tank 69. After branch path 70 reaches a bottom portion in reducing agent tank 69, it is turned around, and is again taken out of the upper surface side of reducing agent tank 69.

Therefore, branch path 70 has a region provided with a height difference from low to high in midstream of the path. Branch path 70 has a low region provided in midstream of the path through which the engine coolant flows and a high region provided downstream of the low region.

For example, branch path 70 has such a construction that a low region which is the lower surface portion around reducing agent tank 69, a high region which is the upper surface side of reducing agent tank 69, and a low region which is the bottom portion in reducing agent tank 69 are continuous. The high region of branch path 70 is provided between the low region before reducing agent tank 69 and the low region within reducing agent tank 69.

Therefore, at least a height difference from low to high by a height of reducing agent tank 69 is provided in midstream of branch path 70.

<Monitor Apparatus>

A configuration of monitor apparatus 21 will now be described.

Figure 8:
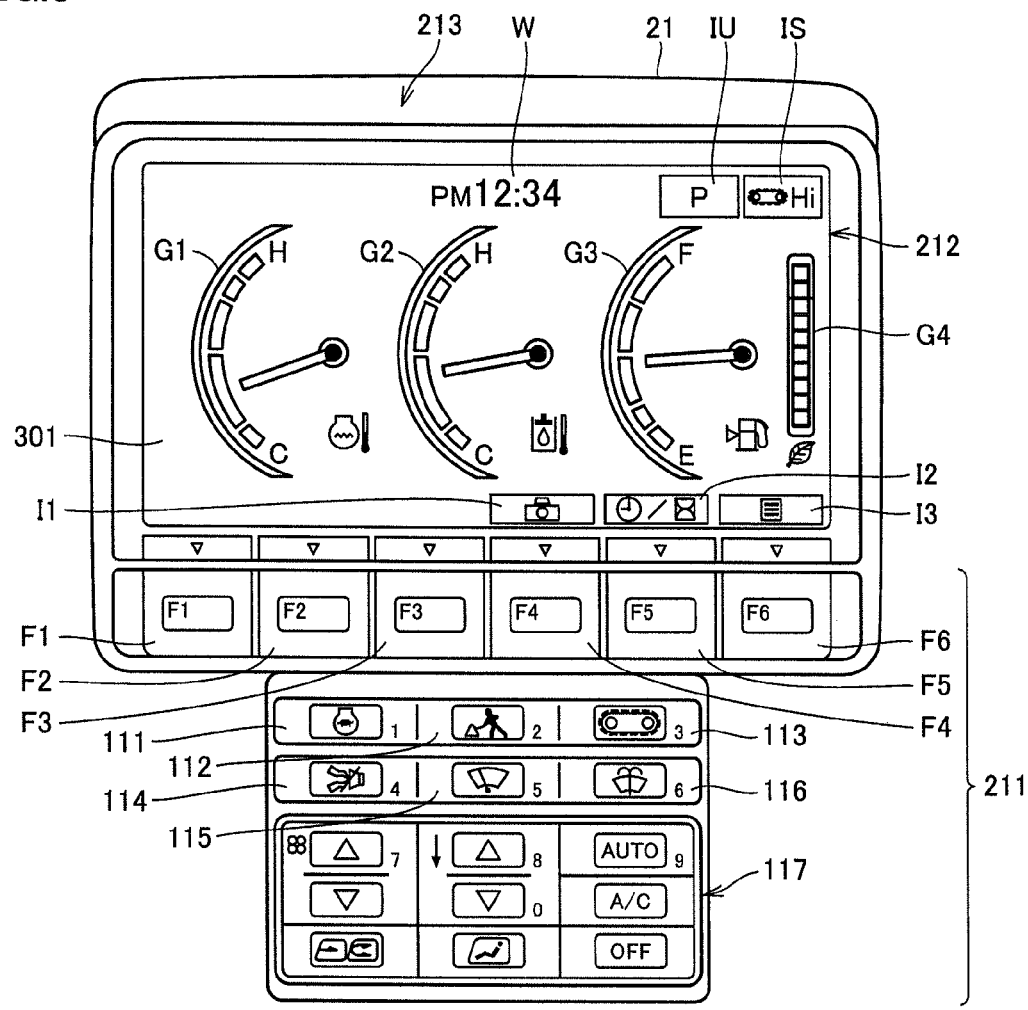
FIG. 8 is a diagram illustrating a configuration of a monitor apparatus 21 based on the embodiment.

FIG. 8 is a diagram illustrating a configuration of monitor apparatus 21 based on the embodiment.

As shown in FIG. 8, monitor apparatus 21 includes an input portion 211, a display portion 212, and a display control unit 213.

Input portion 211 accepts input of various types of information. Monitor apparatus 21 is connected to main controller 50, and input accepted at input portion 211 is output to main controller 50.

Display portion 212 is implemented by a liquid crystal screen or the like.

Display control unit 213 controls display contents on display portion 212. Specifically, display control unit 213 provides display of information on an operation of work vehicle 101 in response to an instruction from main controller 50. The information includes information on an engine state or guidance information, warning information, and the like.

Input portion 211 will specifically be described. Input portion 211 is constituted of a plurality of switches. Input portion 211 has function switches F1 to F6.

Function switches F1 to F6 are located in a lower portion of display portion 212 and displayed as "F1" to "F6", respectively. They are switches each for inputting a signal corresponding to an icon displayed on display portion 212 above each switch (by way of example, guidance icons I1 to I3).

In addition, input portion 211 has a deceleration switch 111, an operation mode selection switch 112, a travel speed gear selection switch 113, a buzzer cancellation switch 114, a wiper switch 115, a washer switch 116, and an air-conditioner switch 117, provided under function switches F1 to F6.

Deceleration switch 111 is a switch for carrying out deceleration control for lowering the number of engine rotations of engine 36 to a prescribed number of rotations a prescribed time period after work implement lever 18, 19 returned to a neutral position. The "neutral position" refers to a state that work implement lever 18, 19 is not operated (a non-working state).

Operation mode selection switch 112 is a switch for selecting an operation mode of work vehicle 101 from among a plurality of operation modes. Travel speed gear selection switch 113 is a switch for selecting a travel speed gear of work vehicle 101 from among a plurality of travel speed gears. Buzzer cancellation switch 114 is a switch for cancelling buzzer sound generated at the time when work vehicle 101 is in a prescribed warning condition. Wiper switch 115 is a switch for operating a wiper (not shown) provided in a windshield of operator's cab 8 (see FIG. 2) of work vehicle 101. Washer switch 116 is a switch for actuating a washer (not shown) for injecting cleaning water toward the windshield. Air-conditioner switch 117 is a switch for operating various functions of an air-conditioner within operator's cab 8.

It is noted that a touch panel of a resistive film type or the like is also applicable as input portion 211. In the present example, a case where work vehicle 101 displays a standard picture 301 displayed during a normal operation as a picture displayed on display portion 212 is shown.

Standard picture 301 is generated by display control unit 213 based on picture data stored in advance in a not-shown memory. This is also the case with other pictures.

In standard picture 301, an engine water temperature gauge G1, a hydraulic oil temperature gauge G2, and a fuel level gauge G3 are displayed as aligned, and a pointer of a gauge changes based on a sensor signal from each corresponding sensor. In addition, a fuel consumption gauge G4 is displayed on the right of fuel level gauge G3.

A clock W is displayed in an upper central portion of display portion 212. On the right of clock W, an operation mode icon IU indicating a set operation mode and a travel speed gear icon IS indicating a set travel speed gear are displayed.

In standard picture 301, a character "P" is displayed as operation mode icon IU. This is an indication of a case where an operation mode is set to a power mode made use of in normal excavation working or the like.

In contrast, in a case where work vehicle 101 is set to an economy mode, it is assumed that a character "E" is displayed as operation mode icon IU.

At a position in a lower portion of standard picture 301 and above function switches F4 to F6, guidance icons I1 to I3 corresponding to function switches F4 to F6, respectively, are displayed.

Guidance icon I1 is an icon meaning switching of a picture displayed on display portion 212 to a camera screen. The camera screen is a screen output by means of an image signal obtained by a CCD camera or the like (not shown) installed on the exterior of work vehicle 101 and shooting an outside world of work vehicle 101. Guidance icon I2 is an icon meaning switching of display of clock W to display of a service meter. Guidance icon I3 is an icon meaning switching of a picture displayed on display portion 212 to a user mode picture. Therefore, for example, when function switch F4 corresponding to guidance icon I1 is pressed, a picture displayed on display portion 212 is switched to a camera screen.

Figure 9:
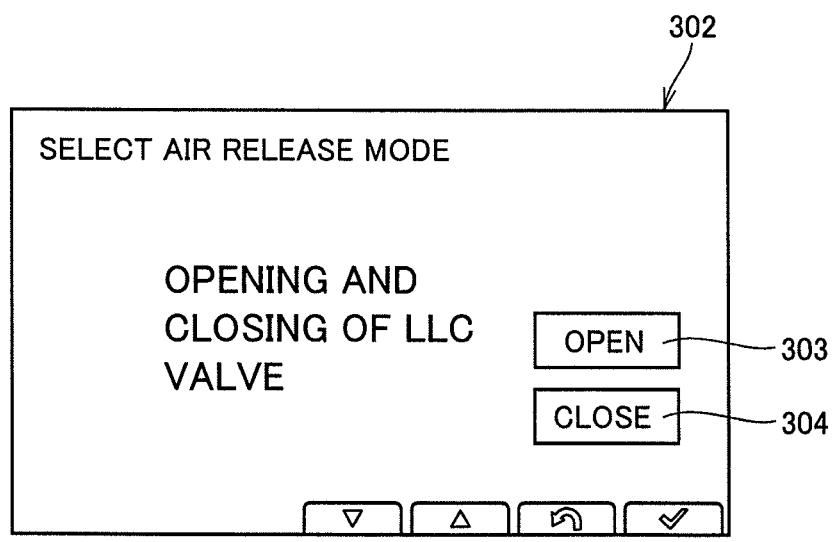
FIG. 9 is a diagram illustrating one example of an air release mode selection picture based on the embodiment.

FIG. 9 is a diagram illustrating one example of an air release mode selection picture based on the embodiment.

As shown in FIG. 9, an air release mode selection picture 302 is displayed as transition from standard picture 301 as a result of selection of a prescribed function switch by way of example. Air release mode selection picture 302 is operated before the engine coolant is fed to branch path 70 for preventing the reducing agent from freezing or for thawing the reducing agent.

In the present example, in air release mode selection picture 302, a picture capable of accepting an input instruction for setting the LLC valve to an opened state or a closed state is shown.

In the present example, in connection with opening and closing of the LLC valve, an "open" item 303 and a "close" item 304 are provided.

When an operator selects "open" item 303 and indicates execution, LLC valve 75 is set to the opened state. By moving a cursor over a position of "close" item 304 and indicating execution, LLC valve 75 can also be set to the closed state. Thus, monitor apparatus 21 serves as an accepting portion for accepting an operation instruction from an operator.

After lapse of a prescribed period sufficient for determining that air release ended after opening of LLC valve 75, LLC valve 75 may automatically be set to the closed state. With such processing, convenience for an operator can be enhanced.

In the present embodiment, branch path 70 is provided for heat exchange with the reducing agent in reducing agent tank 69.

In the present embodiment, before making use of branch path 70 for preventing the reducing agent from freezing or for thawing the reducing agent, "open" item 303 is selected in air release mode selection picture 302, so that LLC valve 75 is opened and the engine coolant is supplied to branch path 70. Thus, air in branch path 70 is pushed out to circulation path 74. Then, in radiator 71 coupled to circulation path 74, air in the path is emitted into the outside air. In the present example, air can be released even though thermostat 76 is not opened. Specifically, an air release path 63A (a dotted line in FIG. 3) is provided from circulation path 74 for circulating the engine coolant for cooling turbo charger 63 to radiator 71. Air pushed out to circulation path 74 is emitted from the replenish port of radiator 71 through air release path 63A. Though such a construction that air release path 63A (the dotted line) is provided from circulation path 74, which leads to turbo charger 63, to radiator 71 has been described by way of example, limitation thereto is not particularly intended, and an air release path from another region to radiator 71 may be provided or an air release port allowing air release may be provided in a part of circulation path 74 separate from radiator 71.

Therefore, air in branch path 70 for supplying the engine coolant into reducing agent tank 69 can sufficiently be released before branch path 70 is made use of for preventing the reducing agent from freezing or for thawing the reducing agent. Thus, lowering in efficiency in heat exchange can be suppressed.

In the present embodiment, the number of rotations of fan 200 is adjusted by selecting "open" item 303 in air release mode selection picture 302. Specifically, fan control unit 52 instructs fan drive portion 210 to increase the number of rotations of fan 200. By way of example, the number of rotations of fan 200 is set to the maximum number of rotations. By increasing the number of rotations of fan 200, wind power increases and increase in temperature of the engine coolant can be suppressed.

Though monitor apparatus 21 accepts an instruction for opening and closing of the LLC valve in the present example, limitation to monitor apparatus 21 is not particularly intended, and such a member as a button for accepting an instruction for opening and closing of the LLC valve may be provided independently of monitor apparatus 21 and used to accept an instruction for opening and closing of the LLC valve.

A scheme with which air in a path for supplying the engine coolant into the reducing agent tank can more effectively be released will be described.

Figure 10:
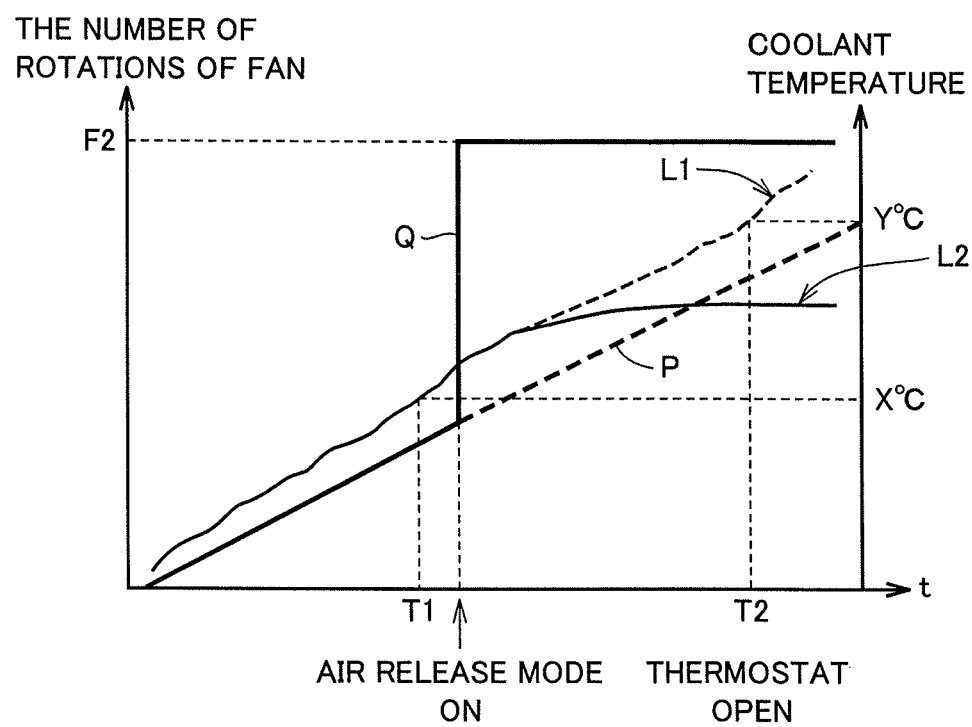
FIG. 10 is a diagram illustrating the number of rotations of the fan and a temperature of an engine coolant, as well as timing to start an air release mode based on the present embodiment.

FIG. 10 is a diagram illustrating the number of rotations of the fan and a temperature of an engine coolant, as well as timing to start an air release mode based on the present embodiment.

As shown in FIG. 10, here, the left ordinate represents the number of rotations of the fan and the abscissa represents time t. The right ordinate represents a temperature of the engine coolant. Here, lines L1, L2 each indicate a temperature of a coolant. A line P indicates a normal fan rotation control line. A line Q indicates a fan rotation control line in the air release mode.

After engine 36 is started, the number of engine rotations of engine 36 is set to the number of engine rotations representing a low idling state. A temperature of the engine coolant increases with start of engine 36. A temperature of the engine coolant is detected by sensor 73. A case that a temperature of the engine coolant attained to X° C. at time T1 is shown.

Fan 200 is controlled in accordance with a temperature of the engine coolant. Fan control unit 52 increases the number of rotations of fan 200 along line P with increase in temperature of the engine coolant.

When the temperature of the engine coolant attains to X° C. at time T1, the number of engine rotations is set to the number of engine rotations representing a high idling state. This is because, if the number of engine rotations is increased while a temperature of the engine coolant is low, load imposed on engine 36 becomes high. Though a temperature of the engine coolant is lower than X° C. in an initial state in the present example, when a temperature is X° C. in the initial state, the number of engine rotations may initially be set to the number of engine rotations representing the high idling state.

After the number of engine rotations is set to the high idling state, the air release mode is set to on (open).

In the present embodiment, the air release mode is set to on (open) so as to release air in circulation path 74 while the number of engine rotations is in the high idling state. Water pump 61 in the present embodiment supplies the engine coolant to circulation path 74 with driving force from engine 36. Therefore, with increase in number of rotations of engine 36, a pressure of supply of the engine coolant from water pump 61 to circulation path 74 is higher. Accordingly, when LLC valve 75 of circulation path 74 is opened in the high idling state, the engine coolant is supplied with a supply pressure to branch path 70 being high. Therefore, air in branch path 70 is released by the engine coolant high in supply pressure, so that air in branch path 70 is pushed out to circulation path 74 and air can effectively be released.

When the air release mode is set to on (open), the number of rotations of fan 200 is set to the maximum number of rotations F2 along line Q representing the fan rotation control line in the air release mode. Thus, the temperature of the engine coolant is adjusted to a prescribed temperature which is not a high temperature state (equal to or higher than Y° C.) as shown with line L2. The prescribed temperature is set to such a temperature that thermostat 76 is not opened.

When the number of rotations of fan 200 is controlled along line P representing the normal fan rotation control line, the temperature of the engine coolant makes transition to a high temperature state as shown with line L1. Then, at time T2, the temperature of the engine coolant is set to Y° C. and thermostat 76 is opened.

When thermostat 76 is opened during the air release mode, a supply path to radiator 71 is added to circulation path 74 through which the engine coolant is circulated. The added supply path will increase a length of circulation path 74 and it takes time for air release. The added path will lower a supply pressure of water pump 61, which could result in insufficient air release.

In the present embodiment, in order to prevent thermostat 76 from being opened in the air release mode, the number of rotations of fan 200 is controlled to suppress increase in temperature of the engine coolant.

<Flow Processing>

Figure 11:
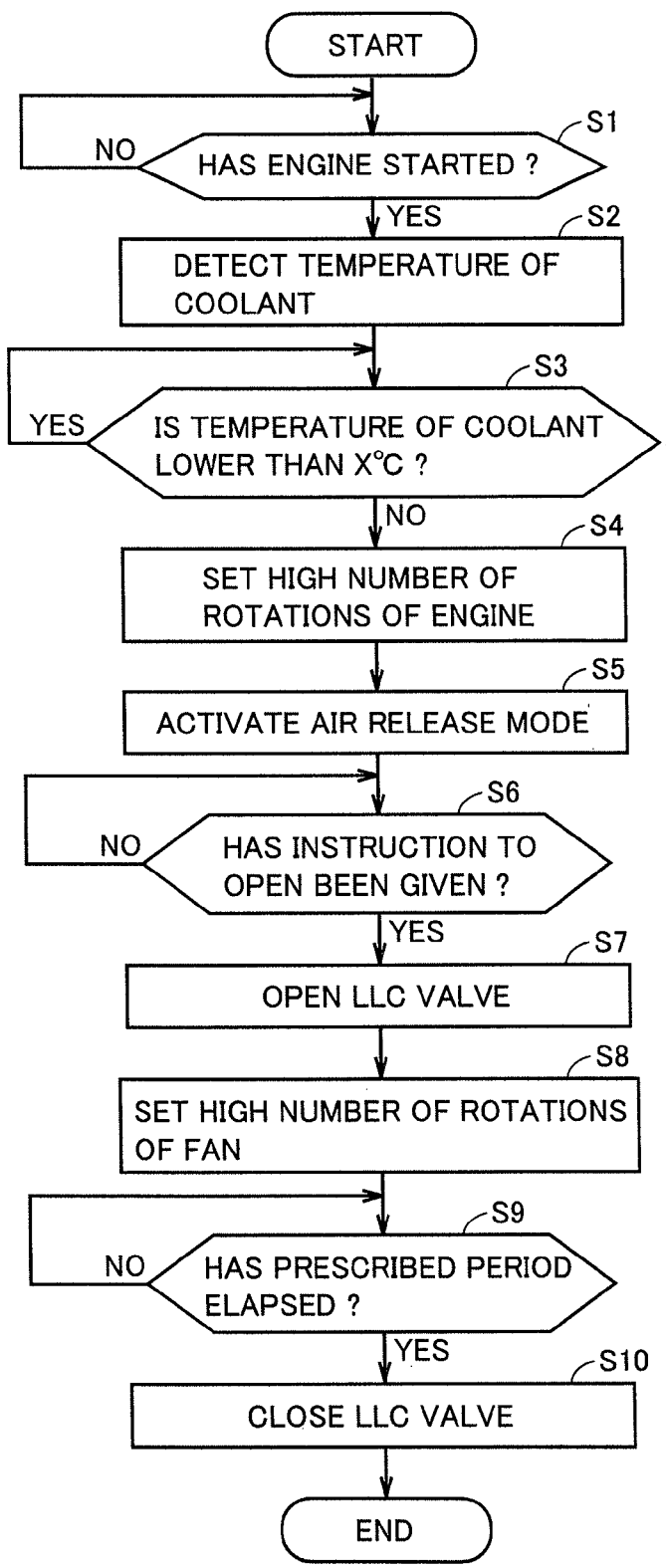
FIG. 11 is a flowchart illustrating processing in the air release mode in a main controller 50 of work vehicle 101 based on the embodiment.

FIG. 11 is a flowchart illustrating processing in the air release mode in main controller 50 of work vehicle 101 based on the embodiment.

As shown in FIG. 11, initially, whether or not the engine has started is determined (step S1). Main controller 50 determines whether or not engine controller 38 has caused engine 36 to start.

Then, a temperature of the engine coolant is detected (step S2). Main controller 50 detects a temperature of the engine coolant from sensor 73.

Then, whether or not a temperature of the engine coolant is lower than X° C. is determined (step S3). Main controller 50 determines whether or not a temperature of the engine coolant is lower than X° C. based on a result of detection obtained from sensor 73.

When it is determined in step S3 that a temperature of the engine coolant is lower than X° C. (YES in step S3), that state is maintained. When it is determined in step S3 that a temperature of the engine coolant is not lower than X° C. (NO in step S3), the high number of rotations is set (step S4). When main controller 50 determines that a temperature of the engine coolant is not lower than X° C., it instructs engine controller 38 to set the number of engine rotations to the high number of rotations.

Though a scheme for suppressing load imposed on the engine by restricting the number of rotations of the engine when the temperature of the engine coolant is as low as less than X° C. is adopted in the present example, the scheme is not essential, and the number of rotations of the engine may be set to the high number of rotations after the engine is started.

Then, the air release mode is activated (step S5). Main controller 50 makes setting so as to allow acceptance of an instruction for opening and closing of the LLC valve in air release mode selection picture 302. For example, selection of a prescribed function switch described with reference to FIG. 9 may be activated.

Though the air release mode is activated after the number of engine rotations is set to the high number of rotations in the present example, limitation to that scheme is not intended. An instruction for the air release mode can be accepted even before the number of engine rotations is set to the high number of rotations, and an instruction for the air release mode may be executed after the number of engine rotations is set to the high number of rotations.

Then, whether or not an instruction for opening has been given is determined (step S6). Valve control unit 51 of main controller 50 determines whether or not "open" item 303 has been selected in air release mode selection picture 302.

After stand-by until an instruction for opening is given and when it is determined in step S6 that an instruction for opening has been given (YES in step S6), LLC valve 75 is set to the opened state. When "open" item 303 has been selected, valve control unit 51 of main controller 50 instructs LLC valve 75 to be in the opened state (step S7).

Then, fan 200 is set to the high number of rotations (step S8). Fan control unit 52 instructs fan drive portion 210 to adjust the number of rotations of fan 200 to the maximum number of rotations F2 in response to a selection instruction of "open" item 303.

Then, whether or not a prescribed period has elapsed is determined (step S9). Valve control unit 51 of main controller 50 determines whether or not a prescribed period has elapsed after LLC valve 75 is set to the opened state.

The prescribed period is desirably set to a period equal to or longer than a time period from a time point of start of engine 36 until thermostat 76 opens as a result of increase in temperature of the engine coolant.

Thus, by making determination with a time period from a time point of start of engine 36 until opening of thermostat 76 being defined as the reference, air in the entire path for the engine coolant (circulation path 74+branch path 70) can be released.

For example, approximately 15 minutes can be set as a prescribed period. The period is by way of example, and any length may be set so long as air release processing can be performed.

When it is determined in step S9 that a prescribed period has elapsed (YES in step S9), LLC valve 75 is set to the closed state (step S10). Valve control unit 51 of main controller 50 instructs LLC valve 75 to be in the closed state when a prescribed period has elapsed after LLC valve 75 is set to the opened state. When LLC valve 75 is set to the closed state, fan control unit 52 adjusts the number of rotations of fan 200 in accordance with the normal fan rotation control line. Though a scheme for instructing LLC valve 75 to be in the closed state when a prescribed period elapses is described in the present example, LLC valve 75 may be set to the closed state in response to an instruction from an operator. Specifically, valve control unit 51 may instruct LLC valve 75 to be in the closed state as it accepts an instruction to select "close" item 304 from the operator in air release mode selection picture 302 described with reference to FIG. 9.

Then, the process ends (end).

With such processing, LLC valve 75 can be set to the opened state and air in branch path 70 can be released while the number of rotations of fan 200 is set to the maximum number of rotations.

For example, when thermostat 76 is opened during the air release mode, a supply path to radiator 71 is also added to circulation path 74 through which the engine coolant is circulated.

Addition of the path will increase a length of circulation path 74 and it takes time for air release. In a case that a path length of branch path 70 is long or a height difference (for example, a height difference by a height of reducing agent tank 69) is provided in midstream of branch path 70, a pressure for pushing air in branch path 70 from branch path 70 into circulation path 74 is necessary. Addition of the supply path to radiator 71 will lead to pressure lowering, which could result in insufficient air release.

By suppressing increase in temperature of the engine coolant in the air release mode with the scheme in the present embodiment, thermostat 76 can be prevented from opening to add to circulation path 74, the supply path to radiator 71, and air can sufficiently be released.

Though the number of rotations of fan 200 is set to the maximum number of rotations F2 along line Q representing the fan rotation control line in the air release mode when the air release mode is set to on (open) in the present example, any number of rotations may be set so long as the number of rotations of fan 200 is increased such that a temperature of the engine coolant is not in the high temperature state (Y° C.). For example, the number of rotations of fan 200 may be controlled along another fan rotation control line greater in inclination than line P such that a temperature of the engine coolant is not in the high temperature state (Y° C.).

Though a hydraulic excavator has been described by way of example of a work vehicle, application also to such a work vehicle as a bulldozer or a wheel loader is possible, and application to any work machine provided with engine 36 is possible.

Though the embodiment of the present invention has been described above, it should be understood that the embodiment disclosed herein is illustrative and non-restrictive in every respect. The scope of the present invention is defined by the terms of the claims, and is intended to include any modifications within the scope and meaning equivalent to the terms of the claims.

REFERENCE SIGNS LIST

1 lower carrier; 3 upper revolving unit; 4 work implement; 5 boom; 6 arm; 7 bucket; 8 operator's cab; 9 operator's seat; 10 travel operation portion; 11, 12 travel lever; 13, 14 travel pedal; 15 pedal for attachment; 16 side window; 17 dashboard; 18, 19 work implement lever; 20 locking lever; 21 monitor apparatus; 22 front window; 23 vertical frame; 31A first hydraulic pump; 31B second hydraulic pump; 32 swash plate drive apparatus; 34 control valve; 35 hydraulic actuator; 36 engine; 38 engine controller; 39 fuel dial; 40 rotation sensor; 41 work implement lever apparatus; 42 pressure switch; 43 valve; 45 potentiometer; 46 starter switch; 47 pressure sensor; 50 main controller; 51 valve control unit; 52 fan control unit; 60 exhaust gas purification apparatus; 61 water pump; 62 exhaust purification unit; 62A diesel oxidation catalyst apparatus; 62B diesel particulate filter apparatus; 64 mixing piping; 65 selective catalytic reduction apparatus; 66 flue; 68 reducing agent injection valve; 69 reducing agent tank; 70 branch path; 71 radiator; 72, 73 sensor; 74 circulation path; 75 LLC valve; 76 thermostat; 83 reducing agent supply path; 84 reducing agent injector; 91 plate; 92 vertical frame; 93 horizontal frame; 94 bracket; 95 body frame; 96A, 96B vertical plate; 101 work vehicle; 111 deceleration switch; 112 operation mode selection switch; 113 travel speed gear selection switch; 114 buzzer cancellation switch; 115 wiper switch; 116 washer switch; 117 air-conditioner switch; 200 fan; 210 fan drive portion; 211 input portion; 212 display portion; 213 display control unit; 301 standard picture; and 302 air release mode selection picture.

The invention claimed is:

1. A work vehicle, comprising:
an engine;
an exhaust gas purification apparatus for purifying a nitrogen oxide in an exhaust gas emitted from said engine;
a reducing agent tank for storing a reducing agent to be supplied to said exhaust gas purification apparatus;
an engine coolant circuit including a water pump for circulating an engine coolant for cooling of said engine through a circulation path as said engine is driven;
a branch path brandied from said circulation path and provided for heat exchange between said engine coolant and said reducing agent in said reducing agent tank;
a valve for controlling supply of said engine coolant into said branch path;
an accepting portion configured to accept an air release mode instruction instructed by an operator that releases air in the branch path by opening the valve and releasing the air to an air release path;
a main controller including a valve control unit programmed to give an instruction for an opening operation of said valve in response to said air release mode instruction from said operator accepted by said accepting portion;
a fan for generating cooling wind in an engine room;
a radiator for cooling said engine coolant with said cooling wind;
a thermostat provided between said circulation path and said radiator and operating to open for supplying said engine coolant to said radiator when a temperature of said engine coolant is equal to or higher than a prescribed temperature; and
the main controller further including a fan control unit programmed to increase the number of rotations of said fan in response to said air release mode instruction from said operator accepted by said accepting portion to thereby prevent the thermostat from operating to open and to release air in the branch path.

2. The work vehicle according to claim 1, further comprising an engine coolant sensor for detecting a temperature of said engine coolant, wherein
said fan control unit can select any one of a first control line provided such that the number of rotations of said fan increases in accordance with increase in temperature of said engine coolant and a second control line higher in the number of rotations of said fan set in accordance with increase in temperature of said engine coolant than said first control line, and controls the number of rotations of said fan in accordance with said second control line when the air release mode instruction from said operator has been given.

3. The work vehicle according to claim 2, wherein
said fan control unit sets the number of rotations of said fan to a maximum number of rotations in response to said air release mode instruction from said operator.

4. The work vehicle according to claim 1, wherein
said accepting portion is implemented by a monitor apparatus, and
said monitor apparatus outputs said air release mode instruction to said valve control unit and said fan control unit.

5. The work vehicle according to claim 1, wherein
said valve control unit gives an instruction for a closing operation of said valve after lapse of a prescribed period since the valve control unit gave the instruction for said opening operation of said valve.

6. The work vehicle according to claim 1, wherein
said reducing agent tank is provided on one end side in a longitudinal direction of a body frame, and said engine is provided on the other end side in the longitudinal direction of said body frame.

7. The work vehicle according to claim 1, wherein
said branch path has a low region provided in midstream of a path through which said engine coolant flows and a high region higher than said low region provided downstream of said low region.

8. A method of controlling a work vehicle, comprising the steps of:

accepting an instruction for an opening operation instructed by an operator, of a valve provided in a path for introducing an engine coolant into a reducing agent tank, to release air in the path;

outputting an instruction signal indicating an opening operation of said valve in response to acceptance of the instruction for said opening operation by said operator; and outputting a command signal for increasing the number of rotations of a fan for generating cooling wind in an engine room in response to acceptance of the instruction for said opening operation by said operator to thereby release air in the path.

\* \* \* \* \*